(12) United States Patent
Malmberg

(10) Patent No.: US 6,189,280 B1
(45) Date of Patent: Feb. 20, 2001

(54) WALL EXPOSED TO WEAR, WEAR-RESISTING LINING ELEMENT AND FASTENING MEANS THEREFOR

(75) Inventor: Mats Anders Malmberg, Trelleborg (SE)

(73) Assignee: Sveldala Trellex AB, Trelleborg (SE)

( * ) Notice: Under 35 U.S.C. 154(b), the term of this patent shall be extended for 0 days.

(21) Appl. No.: 09/213,629

(22) Filed: Dec. 18, 1998

Related U.S. Application Data

(63) Continuation of application No. PCT/SE98/02266, filed on Dec. 9, 1998, now abandoned.

(30) Foreign Application Priority Data

Feb. 27, 1998 (SE) ..................................................... 9800624

(51) Int. Cl.$^7$ ............................... E04B 1/38; B02C 17/22
(52) U.S. Cl. ................. 52/506.05; 52/127.7; 52/513; 52/705; 241/183; 411/103; 411/111
(58) Field of Search .................... 52/506.01, 506.02, 52/506.05, 471, 597, 511–513, 127.7, 705, 707, 309.1, 309.8, 309.11, 309.14; 241/182, 183; 110/324, 335, 336; 411/103, 108, 111

(56) References Cited

U.S. PATENT DOCUMENTS

| | | | |
|---|---|---|---|
| 2,186,511 | * 1/1940 | Welch | ................................. 52/471 X |
| 3,282,231 | * 11/1966 | Walt | ..................................... 52/471 X |
| 3,350,832 | * 11/1967 | Persson | ................................... 52/509 |
| 3,942,239 | 3/1976 | Johansson . | |
| 3,981,117 | * 9/1976 | Dehlen | ..................................... 52/509 |
| 4,052,832 | * 10/1977 | Jungers et al. | ........................... 52/496 |
| 4,084,362 | * 4/1978 | Piazza | ................................. 52/513 X |
| 4,866,891 | * 9/1989 | Young | ............................ 52/309.12 X |
| 4,881,348 | * 11/1989 | Davis | ..................................... 52/127.7 |
| 5,509,241 | * 4/1996 | Coconis et al. | ..................... 52/600 X |

FOREIGN PATENT DOCUMENTS

| | | |
|---|---|---|
| 4315421 A1 | 11/1993 | (DE) . |
| 3-183861 | * 8/1991 | (JP) ..................................... 52/597 |
| 305 999 | 11/1968 | (SE) . |
| 335 839 | 6/1971 | (SE) . |
| 347 664 | 8/1972 | (SE) . |
| 7406072 | 5/1974 | (SE) . |

* cited by examiner

Primary Examiner—Carl D. Friedman
Assistant Examiner—Winnie Yip
(74) Attorney, Agent, or Firm—Kinney & Lange, P.A.

(57) ABSTRACT

A wall exposed to wear has a wear lining composed of a number of juxtaposed wear lining elements of an elastomeric material or of a mix of elastomeric and other wear-resistant materials. The wear lining elements are secured to a supporting surface with fastening means. Two opposite narrow faces of the wear lining elements have V-shaped recesses, which open toward the narrow faces. The fastening means have washers with V-shaped projections, the V-legs of which are inserted into and abut against the bottom wall of the recesses or into shoulders formed in the recesses, after fastening the elements.

19 Claims, 3 Drawing Sheets

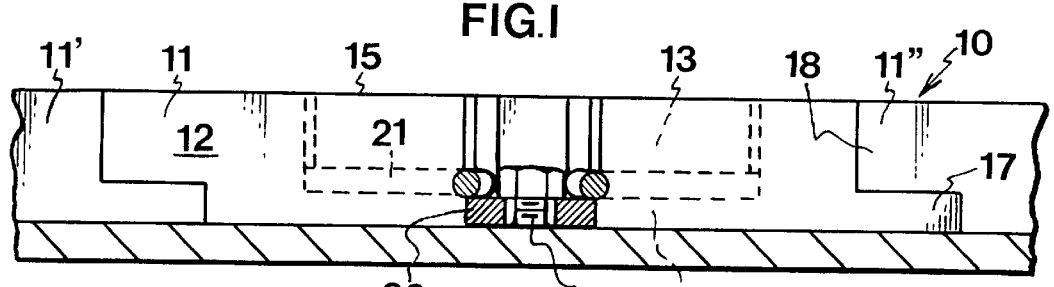
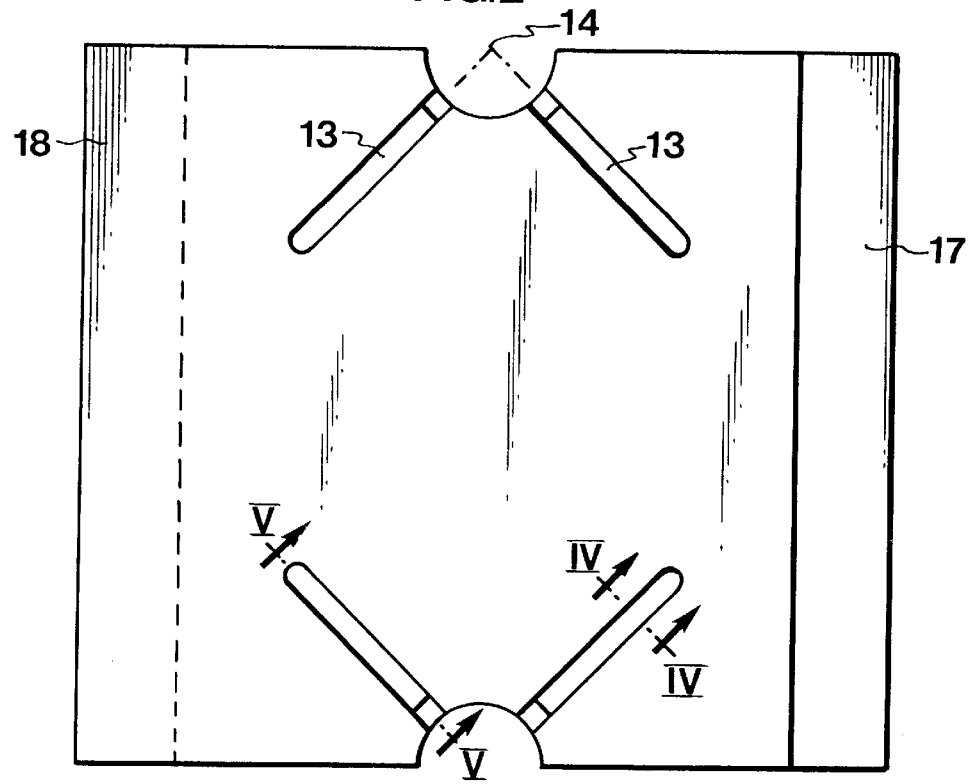
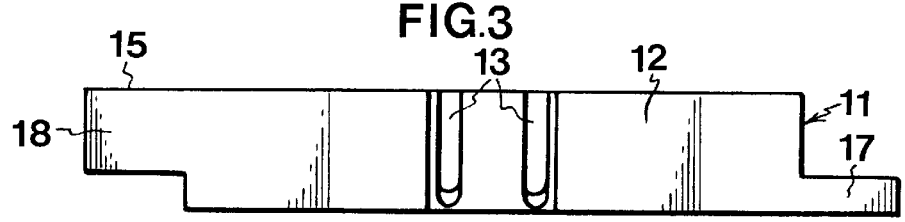
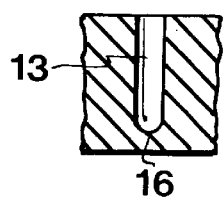
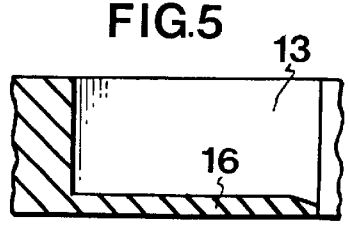

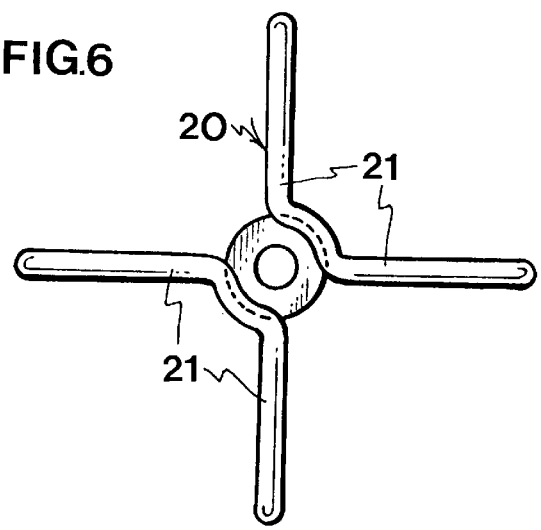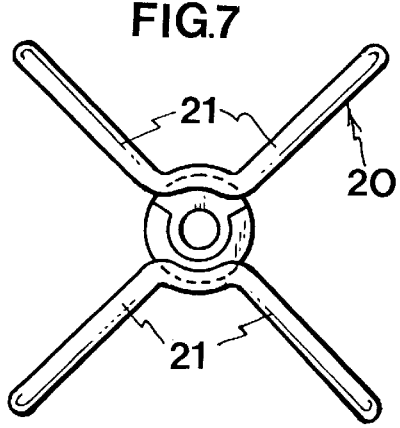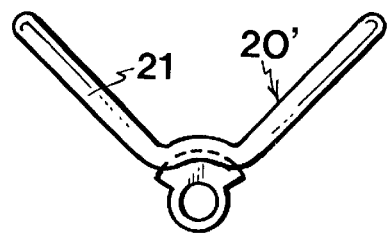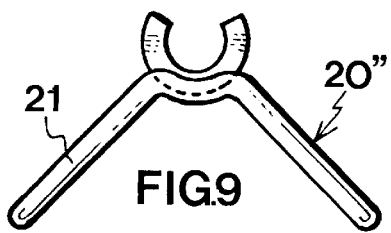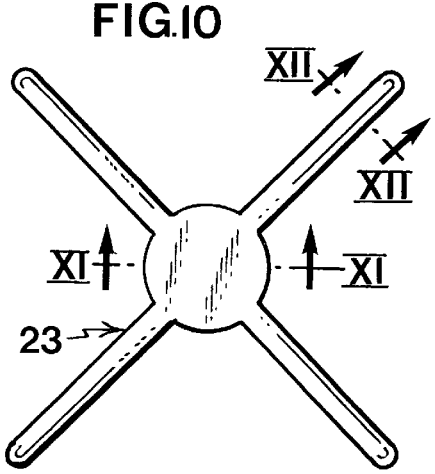

WALL EXPOSED TO WEAR, WEAR-RESISTING LINING ELEMENT AND FASTENING MEANS THEREFOR

This is a Continuation of International Application PCT/SE98/02266, with an international filing date of Dec. 9, 1998, now abandoned with regard to the United States of America.

FIELD OF THE INVENTION

The present invention relates to a wear lining for walls which, when used, are exposed to wear. Such walls can be found in, for instance, pockets, lorry platforms, vertical chutes, skips and mill drums for use in the stone-working and mining industry. Such walls are in most cases provided with a wear lining to increase the resistance of the walls to wear and impacts or shocks.

BACKGROUND ART

Many types of linings are described in the literature. SE-B-305,999 discloses a lining used for mill drums and comprising a number of shell plates and arranged therebetween a number of lifter bars. The shell plates and the lifter bars are made of a wear-resistant elastomeric material, usually wear-resistant rubber or polyurethane. The lifter bars are on their side facing the supporting surface provided with metal sheets, which are fixed by vulcanizing or gluing and which after mounting abut against metal strips which are attached by vulcanizing or gluing to the underside of the shell plates and protrude therefrom. The lifter bars are clamped to the protruding metal strips of the shell plates by means of fixing bolts which are passed through the casing metal sheeting of the mill drum. The same construction has also been used for other walls which are exposed to wear.

SE-B-347,664 discloses another technique of fastening a wear lining comprising plates of an elastomeric material, which have on their underside a plate attached by vulcanizing. In this case, the fastening operation is effected by means of steel nails which from the outside of the mill drum are driven in through a plug of elastomeric material, which is inserted in a hole in the wall of the mill drum. A similar technique has also been used to fasten wear plates from the inside of the space in which wear-causing material moves along or hits the wall. SE-B-335,839 is an example of this technique where anchoring is carried out by means of nails.

SE-B-382,009 discloses a further example of fastening of wear lining plates which have a metal plate attached to their underside by vulcanizing. In this case use is made of fixing components which are placed at the edge of the lining plates or in the joint between two juxtaposed lining elements. The fixing components have one or more cutting edges which when tightening the fixing components cut through the elastomeric material down to the metal plate fixed by vulcanizing, such that this is pressed firmly and unresiliently to the supporting surface. In one embodiment the fixing component is formed as a U-shaped metal plate the legs of which are formed as cutting edges and the web of which has a through hole for a fixing bolt. In another embodiment, the fixing component is a threaded pin having at one end a mounted cutting edge.

All these prior-art constructions function in a satisfactory manner but are disadvantageous since they must use a plate fixed to the underside of the wear lining element by vulcanizing or gluing to ensure the anchoring and also to reduce the risk of the lining plates moving towards and away from their supporting surface ("flapping"). It is in fact desirable to prevent such movements to reduce the risk that particles of the material coming into contact with the wear lining penetrate into the joints between the lining plates. Such penetration may result in the lining being damaged.

U.S. Pat. No. 3,942,239 discloses a wear lining construction which does not require any metal plates fixed by vulcanizing or gluing to achieve a reliable fastening of the plates to their supporting surface and to prevent flapping. In this case, the wear lining plate made of a wear-resistant elastomeric material is provided with a large number of through holes which have an inwardly projecting circumferential flange close to the underside of the plate. Threaded pins are fixed to the supporting surface and extend into these holes. A washer and a nut are then used to clamp the lining plate to its supporting surface. If fastening is to be effected at the edge of the wear lining plate, the plate is formed with a protruding flange against which a metal strip is pressed. The metal strip extends along the entire length of the lining plate to stabilize the plate and prevent it from moving towards and away from its supporting surface and to prevent material from penetrating under the lining plate. Stabilization within the central parts of the wear lining plates is achieved by the holes and fixing bolts of the lining plates being distributed over the entire surface of the lining plates. When a wear lining of this type is to be used for large wall surfaces, a very large number of fixing bolts are thus required. This construction therefore becomes expensive and moreover demands a great deal of mounting work. If no metal strip is used along the end faces of the lining plates, material can penetrate into the gap between two lining plates arranged end face to end face. This can result in the material working its way under the plate of elastomeric material and raising it from its supporting surface, thereby giving the plates a cup-shaped appearance. This implies in turn that the plates are worn more quickly and that further material penetrates under the plates more easily.

SUMMARY OF THE INVENTION

An object of the present invention therefore is to provide a new type of wall which resists wear and abrasion caused by abrasive material. A further object of the invention is to provide wear lining elements and fastening means to form such a wear-resistant wall.

One more object of the present invention is to eliminate wholly or at least partially the drawbacks of prior-art constructions, particularly the above-mentioned "flapping" and the penetration of material between wear lining elements and supporting surface.

According to the invention, these and other objects are achieved by a wall, a wear lining element and fastening means of the types defined in independent claims 1, 5 and 8, respectively. The dependent claims define particularly preferred embodiments of the invention.

Summing up, the invention resides in a wall exposed to wear. The wall has a wear lining which is made of a number of juxtaposed wear lining elements of elastomeric material, optionally in combination with another wear-resistant material. The wear lining elements are clamped to their supporting surface with the aid of fastening means comprising washers. Two opposing edges of the lining elements have V-shaped recesses which are open towards the edge. The washers of the fastening means have V-shaped projections, the V legs of which are inserted into and abut against the bottom of the recesses or shoulders formed in the recesses, after fastening of the elements. The invention also concerns wear lining elements and fastening means with washers of this design.

BRIEF DESCRIPTION OF THE DRAWINGS

A few examples of the invention will now be described in more detail with reference to the accompanying drawings, in which FIG. 1 is a top plan view of an example of an inventive wall exposed to wear, FIG. 2 is a top plan view of a wear lining element included in said wall, FIG. 3 is an end view of the wear lining element in FIG. 2, FIG. 4 is a sectional view along line IV—IV in FIG. 2, FIG. 5 is a sectional view along line V—V in FIG. 2, FIG. 6 is a top plan view of an example of a fastening means according to the invention, FIG. 7 is a top plan view of another example of a fastening means according to the invention, FIG. 8 shows one part of the fastening means in FIG. 7, FIG. 9 shows the other part of the fastening means in FIG. 7, FIG. 10 shows a cover member for use in a wall according to FIG. 1, FIG. 11 is a sectional view along line XI—XI in FIG. 10, FIG. 12 is a sectional view along line XII—XII in FIG. 10.

DESCRIPTION OF THE PREFERRED EMBODIMENTS OF THE INVENTION

Figure 13:
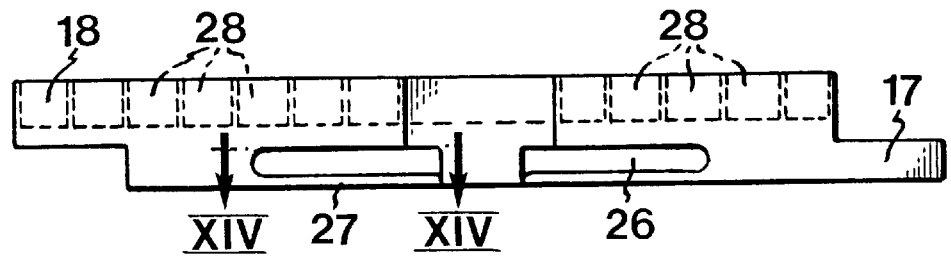
FIG. 13 is an end view of another example of a wear lining element according to the invention.

FIG. 1 shows a first example of a wall according to the present invention. A number of wear lining elements 11 are attached end surface to end surface to a supporting surface 10 with the aid of fastening means (see FIG. 6). The wear lining elements are in this case made entirely of a wear-resistant elastomeric material, such as wear-resistant rubber or polyurethane.

Two opposing narrow faces 12 of these elements 11 are formed with V-shaped recesses 13. The narrow faces 12 of one element engage closely against corresponding narrow faces of adjoining elements 11. In this embodiment, the recesses 13 are formed as two grooves arranged in the form of a V with its point 14, also referred to as its joint point 14, close to the narrow face 12, the grooves being open towards the large face 15, exposed to wear, of the wear lining element. As appears from the sectional views in FIGS. 4 and 5, the grooves do not extend entirely through the wear lining element but leave a bottom wall 16 adjacent to the underside of the element. The extent of the recesses 13 in the longitudinal direction of the element is slightly smaller than one third of the distance between the two opposing narrow faces 12. If longer elements are desired, it is possible to design the elements as multiples of that shown in the drawings, thereby obtaining a cruciform recess 13 between successive elements.

The other two narrow faces of the wear lining element 11 are formed with flanges 17, 18 in the upper and lower parts respectively to make adjoining elements in the wall overlap and lock each other. A required number of rows of wear lining elements are then placed beside and against each other to cover the intended surface of a wall, which is to be provided with a wear-resistant lining of inventive wear lining elements.

In this case the fastening of the wear lining elements 11 is effected with the aid of fastening means which comprise washers 20 and bolts 19, which are fixed to the supporting surface and to which nuts have been screwed. Here use is made of cruciform washers, i.e. washers with two V-shaped projections 21, the points of which are directed towards each other. Alternatively, use can be made of double washers which each have a V-shaped projection 21 and which are arranged to overlap each other on the bolts 19 in order to be jointly fastened by means of the nuts. This embodiment is shown in FIGS. 7–9, where one washer 20' is annular and the other washer 20" is U-shaped.

In the example illustrated, the V-shaped recesses have been increased by a throughgoing semicircular portion 22 to make room for the central parts of the washers 20. Such a semicircular recessed portion 22 need not extend all the way down to the underside of the wear lining element but can leave a shoulder surface or flange, against which part of the central portion of the washer is pressed when tightening the wear lining element against the supporting surface.

If in the embodiment according to FIG. 1 one wishes to fill the grooves or recesses 13 to prevent accumulation of material or dirt therein, the recesses can be filled with the aid of filling members 23 of the design as shown in FIGS. 10–12.

The shown example of a wear lining element is essentially square, but it is also possible to use, for instance, hexagonal wear lining elements where the recesses for the fastening means are formed in two opposing narrow faces, in which case the adjoining narrow faces have a projecting flange conforming to the flange 17 and 18 in FIGS. 1–3, thereby obtaining an overlap between adjoining elements.

Figure 14:
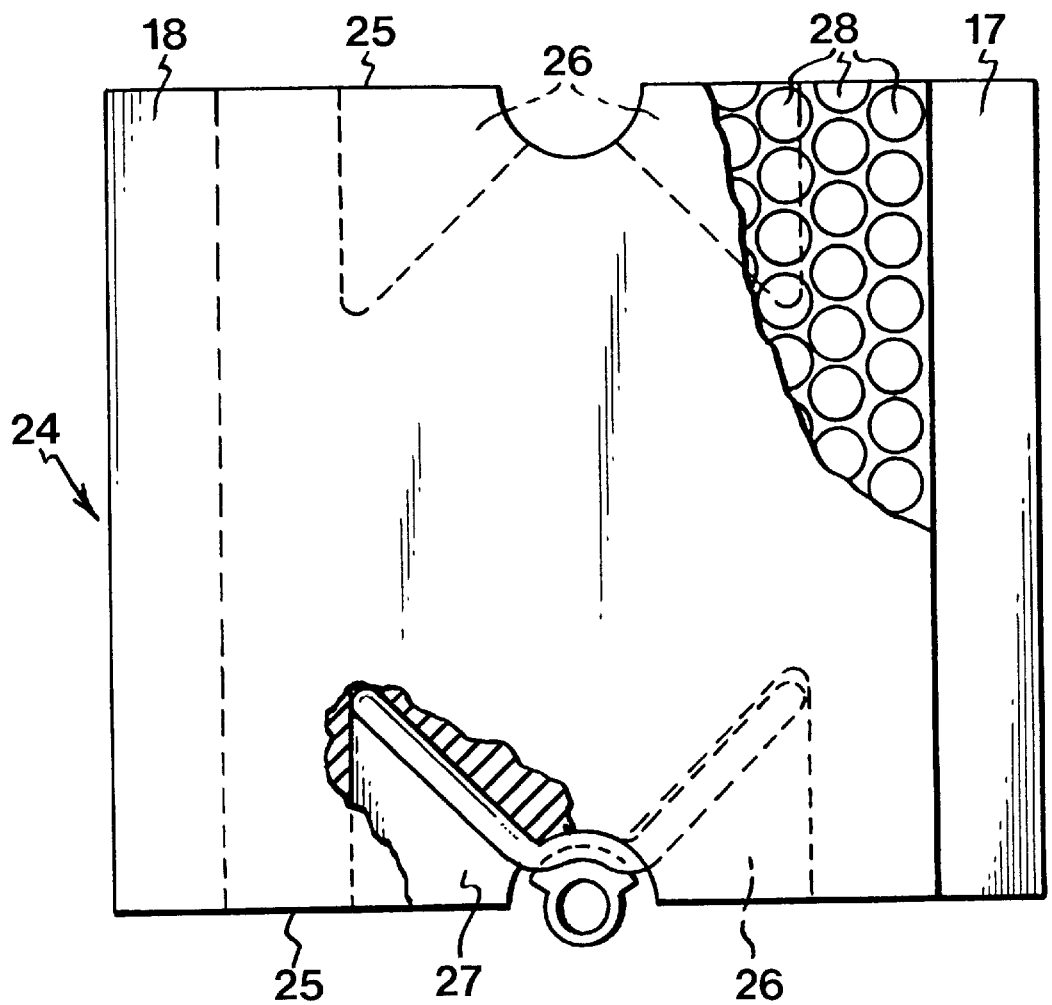
FIG. 14 is a part-sectional top plan view of the element in FIG. 13.

FIGS. 13 and 14 illustrate a further example of an inventive wear lining element 24. Also in this case, the element has in two opposing narrow faces 25 been provided with V-shaped recesses 26 which are open towards these narrow faces. The difference between the embodiment in FIGS. 1–3 and the embodiment in FIGS. 13–14 is that two such V-shaped recesses are formed in each narrow face. The V-shaped recesses are arranged in such manner that their point and one V leg are located in the narrow face, such that the recesses form an outwardly open pocket. In the embodiment according to FIGS. 13–14 there is thus a bottom wall 27, against which the projections 21 of the washers 20 abut and are pressed when the wear lining element is fastened to the supporting surface with the aid of the fastening means, i.e. the washers 20 and bolts by analogy with that shown in FIG. 1. When mounting a wall according to this embodiment of the invention, washers 20', 20" of the type illustrated in FIGS. 8 and 9 are advantageously employed. The washers and their projections are inserted sideways into the pocket-forming recesses 26 before placing the wear lining elements on the supporting surface, and then the washers 20', 20" are slipped on to a common bolt, whereupon the nut is tightened.

As appears from the embodiment in FIGS. 13–14, the wear lining element need not be made of an elastomeric material only. In this embodiment wearing members 28 of a wear-resistant material, such as a ceramic or metallic material, have in fact been inserted into the large face, exposed to wear, of the element. In the example shown, a large number of cylindrical members 28 of a ceramic, metallic-ceramic or metallic material have been molded into polyurethane or some other moldable elastomeric material. However, similar wearing members can be attached to the surface of a body of elastomeric material by being inserted into recesses therein. The fact is that the entire surface of the wear lining element can be covered with a coherent layer of e.g. manganese steel which has been anchored, by vulcanizing or in some other fashion, to the subjacent parts of the wear lining element which are made of elastomeric material. These subjacent parts of elastomeric material (synthetic or natural rubber material) will then act as a shock absorber, which increases the shock-absorbing capacity of the member/members made of a metallic, ceramic or metallic-ceramic material.

If the surface to be covered with wear lining elements does not have dimensions which constitute a multiple of the dimensions of the wear lining elements in the longitudinal and transverse direction, an element can suitably be cut off in a suitable position between the two opposing narrow faces 12 and between the two opposing recesses 13, 26. Sufficient fastening of the cut or incomplete wear lining element is still achieved by the projections of the washers pressing the wear lining element against the supporting surface, thereby preventing any flapping, i.e. relative movements between wear lining element and supporting surface.

The invention provides more reliable anchoring of the wear lining elements to the supporting surface by the fastening pressure being distributed over a larger part of the width of the wear lining elements, calculated between two opposing narrow faces with recesses. It is easy to mount and dismount the wear lining plates or elements by the fact that the washers 20 with their V-shaped projections 21 can be inserted into the recesses 13 after fastening to the supporting surface in the embodiment according to FIGS. 1–3, or can be inserted into the V-shaped recesses or pockets 26 before fastening to the supporting surface in the embodiment according to FIGS. 13–14.

What I claim and desire to secure by Letters Patent is:

1. A wall exposed to wear, the wall having a wear lining formed of a number of juxtaposed wear lining elements comprising an elastomeric material, the wear lining fastened to a supporting surface of the wall with fastening means in the form of bolts and washers, the wear lining elements being plate shaped with two large faces and narrow faces, the wear lining elements in two opposite narrow faces having V-shaped recesses which are open towards said narrow faces and have shoulders or bottom walls, and the washers of the fastening means having V-shaped projections having V legs, the V legs being arranged in the V-shaped recess and abutting against said shoulders or bottom walls after fastening the washers by means of the bolts.

2. A wall as claimed in claim 1, wherein the recesses of the wear lining elements are formed as V-shaped grooves having their joint points adjacent to the opposing narrow faces of the elements and their V legs being open towards the one of the large faces which is exposed to wear of the wear lining element.

3. A wall as claimed in claim 1, wherein the recesses of the wear lining elements are formed as V-shaped pockets each having their joint point and one V leg adjacent to and open towards said opposing narrow faces and being formed to receive a respective one of the V legs of the washers.

4. A wall as claimed in claim 1, wherein the narrow faces of the wear lining elements without V-shaped recesses are formed with projecting complementary flanges to enable two juxtaposed wear lining elements to overlap each other.

5. A wall as claimed in claim 1, wherein the washers of the fastening means have opposite V-shaped projections for engaging V-shaped recesses in two juxtaposed lining elements.

6. A wall as claimed in claim 1, wherein the V-shaped recesses or grooves have an extent approximately corresponding to one third of the width of the wear lining elements between the two opposing narrow faces.

7. A wall as claimed in claim 1, wherein the wear lining elements comprise one or more wearing members of a ceramic, ceramic-metallic or metallic material which are inserted in or fixed to the elastomeric material.

8. A wear lining element comprising an elastomeric material, for forming a wear lining on a wall exposed to wear, the wear lining element having, in two opposing narrow faces, V-shaped recesses which have V legs and their joint points being adjacent to and open towards the respective narrow faces, said joint points providing recessed portions for receiving fasteners.

9. A wear lining element as claimed in claim 8, wherein the V-shaped recesses are formed as V-shaped grooves having said joint points adjacent to the narrow face of the elements and being open towards the narrow faces and having said V legs being open towards the one of the large faces which is exposed to wear when the element is used as intended.

10. A wear lining element as claimed in claim 8, wherein the recesses are formed as V-shaped pockets, which have their joint point and one V leg adjacent to said narrow faces and which are open towards said narrow faces and have a bottom wall or shoulders in the one of the large faces of the element which is adapted to abut against a supporting face.

11. A wear lining element as claimed in claim 8, wherein its narrow faces without V-shaped recesses are formed with projecting complementary flanges to enable two juxtaposed wear lining elements to overlap and lock each other.

12. A wear lining element as claimed in claim 8, wherein it comprises one or more wearing members of a ceramic, metallic-ceramic or metallic material, which are inserted in the elastomeric material or fixed thereto.

13. A fastening mechanism for fastening wear lining elements to a supporting surface, said fastening mechanism comprising:
   a washer having an annular shape defining a hole with an inside edge and having a generally flat top surface; and
   V-shaped projections having joint points affixed on the generally flat top surface of the washer, the V-shaped projections being positioned to leave an access to the top surface of the washer adjacent the hole, such that a threaded fastener can be positioned in said access and extend through the hole for securing the fastening mechanism to a supporting surface, the top surface of the washer adapted to contact an abutment surface of the threaded fastener at a position beyond a top surface of the V-shaped projections.

14. A fastening mechanism as claimed in claim 13, wherein the washer comprises opposite V-shaped projections.

15. The fastening mechanism of claim 13, wherein the washer comprises:
   an inside component having an outer profile; and
   an outside component, the outside component having an inner profile sized to mate with the outer profile of the inside component and thereby secure the outside component to the inside component.

16. The fastening mechanism of claim 15, wherein the inside component is annular shaped and defines an entirely of the inside edge of the hole, and wherein the outside component is U-shaped.

17. The fastening mechanism of claim 15, wherein a first of the V-shaped projections is affixed to the inside annular component, and wherein a second of the V-shaped projections is affixed to the U-shaped component.

18. The fastening mechanism of claim 17, wherein, upon securing the outside component to the inside component, the joint point of the first of the V-shaped projections is directed toward the joint point of the second of the V-shaped projections.

19. A fastening mechanism for fastening wear lining elements to a supporting surface, said fastening mechanism comprising:

a first washer portion defining a hole;

a first V-shaped projection having a point, the first V-shaped projection being affixed to the first washer portion;

a second washer portion, the second washer portion being sized to mate with the first washer portion so as to be jointly securable to a supporting surface by a threaded fastener; and a second V-shaped projection having a point, the second V-shaped projection being affixed to the second washer portion such that, when the first washer portion and the second washer portion are jointly secured to an underlying supporting surface by a threaded fastener, the point of the first V-shaped projection is directed toward the point of the second V-shaped projection.

* * * * *

UNITED STATES PATENT AND TRADEMARK OFFICE
CERTIFICATE OF CORRECTION

PATENT NO. : 6,189,280 B1
DATED : February 20, 2001
INVENTOR(S) : Mats Anders Malmberg It is certified that error appears in the above-identified patent and that said Letters Patent is hereby corrected as shown below:

<u>Title page,</u>
Item [73], Assignee, delete "Sveldala Trellex AB", insert -- Svedala Trellex AB --

Signed and Sealed this

Twenty-first Day of January, 2003

JAMES E. ROGAN
*Director of the United States Patent and Trademark Office*